US007720978B2

(12) United States Patent
Zhu et al.

(10) Patent No.: US 7,720,978 B2
(45) Date of Patent: May 18, 2010

(54) METHOD FOR DATA COMMUNICATION AND SYSTEM THEREOF

(75) Inventors: Ye Zhu, Shenzhen Guangdong (CN); Baohe Zhang, Shenzhen Guangdong (CN); Bo Wu, Shenzhen (CN); Haijun Wu, Shenzhen (CN); Bin Fang, Shenzhen Guangdong (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 382 days.

(21) Appl. No.: 11/951,787

(22) Filed: Dec. 6, 2007

(65) Prior Publication Data

US 2009/0119406 A1 May 7, 2009

Related U.S. Application Data

(63) Continuation of application No. PCT/CN2006/000428, filed on Mar. 20, 2006.

(30) Foreign Application Priority Data

Jun. 6, 2005 (CN) ........................ 2005 1 0074948

(51) Int. Cl.
*G06F 15/16* (2006.01)

(52) U.S. Cl. ........................ 709/228; 709/241; 709/242

(58) Field of Classification Search ........................ None
See application file for complete search history.

(56) References Cited

U.S. PATENT DOCUMENTS 5,295,154 A * 3/1994 Meier et al. ................. 370/351
5,983,323 A * 11/1999 Billard et al. ............... 711/130

(Continued)

FOREIGN PATENT DOCUMENTS

EP 0 634 725 1/1995

(Continued)

OTHER PUBLICATIONS

International Preliminary Report on Patentability for International Application No. PCT/CN2006/000428, dated Dec. 6, 2007.

(Continued)

*Primary Examiner*—Joseph E Avellino
*Assistant Examiner*—Dung Huynh
(74) *Attorney, Agent, or Firm*—Marshall, Gerstein & Borun LLP

(57) ABSTRACT

The present invention discloses a system and method for data communication. In the system and method for data communication, a part of communication peers in the communication system are assigned as super peers, and each super peer forwards message according to its route table. When a communication peer logs in the system, network information of the logged communication peer is saved in a super peer which is logically closest to the logged communication peer through messages forwarded among every super peer. And when an origination communication peer searches for a destination communication peer, the network information of the destination communication peer is saved in a super peer which is logically closest to the destination communication peer through the message forwarded among every super peer in super peer layer. The origination communication peer establishes connection with the destination communication peer based on the network information of the destination communication peer, and implements the data communication through the connection established.

17 Claims, 5 Drawing Sheets

After logging in the communication system , the communication peer logs in the PSP of the communication peer by sending a Pub message to the PSP of the communication peer — 401

The PSP searches for the ID which is closest to the ID of the destination communication peer from the IDs stored in the PSP , then the PSP routes the network information of the communication peer to a third super peer corresponding to the closest ID via forwarding a Pub message — 402

The third super peer searches for an ID which is closest to the ID of the communication peer from the IDs stored in the third super peer , then the third super peer routes the network information of the communication peer to a fourth super peer corresponding to the closest ID get by the third super peer via forwarding the Pub message — 403

404: The fourth super peer determines whether there is an ID which is closer to the ID of the communication peer (Yes → 403; No → 405)

The super peer of the current routing , as the LSP of the logged communication peer, stores the network information of the communication peer — 405

U.S. PATENT DOCUMENTS

| | | | | |
|---|---|---|---|---|
| 6,745,157 | B1 * | 6/2004 | Weiss et al. | 703/2 |
| 6,798,777 | B1 * | 9/2004 | Ferguson et al. | 370/392 |
| 6,980,537 | B1 * | 12/2005 | Liu | 370/338 |
| 7,206,830 | B2 * | 4/2007 | Yamazaki | 709/223 |
| 7,321,928 | B2 * | 1/2008 | Feltin et al. | 709/223 |
| 7,394,817 | B2 * | 7/2008 | Yap | 370/400 |
| 7,461,130 | B1 * | 12/2008 | AbdelAziz et al. | 709/208 |
| 2002/0055989 | A1 * | 5/2002 | Stringer-Calvert et al. | 709/220 |
| 2002/0082036 | A1 * | 6/2002 | Ida et al. | 455/522 |
| 2002/0181445 | A1 * | 12/2002 | Beer | 370/352 |
| 2003/0140108 | A1 * | 7/2003 | Sampathkumar | 709/208 |
| 2003/0149794 | A1 * | 8/2003 | Morris et al. | 709/249 |
| 2003/0208621 | A1 * | 11/2003 | Bowman | 709/242 |
| 2004/0098502 | A1 * | 5/2004 | Xu et al. | 709/238 |
| 2004/0196841 | A1 | 10/2004 | Tudor et al. | 370/389 |
| 2005/0213514 | A1 * | 9/2005 | Su et al. | 370/254 |
| 2006/0293053 | A1 * | 12/2006 | Zanaty | 455/436 |
| 2007/0198675 | A1 * | 8/2007 | Amanuddin et al. | 709/223 |
| 2008/0165765 | A1 * | 7/2008 | Neuhaus | 370/352 |

FOREIGN PATENT DOCUMENTS

| | | |
|---|---|---|
| EP | 1 160 679 | 12/2001 |

OTHER PUBLICATIONS

International Search Report for International Application No. PCT/CN2006/000428, dated Jul. 13, 2006.

Written Opinion for International Application No. PCT/CN2006/000428, dated Jul. 13, 2006.

Zupeng et al., "Research of Peer-to-Peer Network Architecture," *Computer Engineering*, 30(12):29-31 (2004).

* cited by examiner

METHOD FOR DATA COMMUNICATION AND SYSTEM THEREOF

CROSS-REFERENCE TO RELATED APPLICATIONS

This is a continuation of international Application No. PCT/CN2006/000428, filed Mar. 20, 2006, which claims the benefit of Chinese Patent Application No. 200510074948.2, filed Jun. 6, 2005, the respective disclosures of which are incorporated herein by reference.

FIELD OF THE INVENTION

The present invention relates to data communication technologies, and particularly to, method and system for data communication employing peer to peer technology.

BACKGROUND OF THE INVENTION

At present, with development of data communication technologies, multiparty data communication for multiple communicating parties has been implemented. For example, audio and video data can be transmitted among multiple communicating parties, so an audio and video interaction among these communicating parties is implemented.

In the multiparty data communication, network information of each communicating party, such as a port number and IP address, is managed in a uniform manner. That is, the network information of every communicating party is stored and managed by a network information management server. In the multiparty data communication, the communicating parties acquire network information of each other via the network information management server, and establish data connection with each other for data communication based on the network information.

Though data communication can be implemented in the above mentioned way, the network information of every communicating party has to been stored and managed in a uniform manner by the network information management server. Once the network information management server fails, a large number of communicating parties can not acquire the network information of other parties, and fail to establish data connection with destination communicating parties, so data communication in a large area can not be implemented.

In addition, a relay server is also used to implement the data communication. Though the data communication can be implemented by the relay server relaying data, the data communication implemented by the relay server has the following disadvantages.

Since data needs to be relayed by the relay server in the data communication, and the relayed data usually includes large amounts of data, such as audio and video, the relay server needs a wide bandwidth, which increases cost of the relay server. In addition, because of the limited bandwidth of the relay server, the relay server only supports data relay for a limited number of communicating parties. If the number of communicating parties is large, a large number of relay servers will be needed, and the cost of data communication will further be increased. Furthermore, if a relay server fails during the data communication, multiparty data communication forwarded by the relay server will be interrupted, which results in a paralysis of data communication in a certain area.

SUMMARY OF THE INVENTION

The present invention provides a system for data communication, which does not need uniform management of network information of communicating parties, and solve the problem of being unable to implement data communication in a large area when a network information server fails.

The present invention provides a method for data communication, which does not need uniform management of network information of communicating parties, and solve the problem of being unable to implement data communication in a large area when a network information server fails.

The system for data communication including communication peers which establish connections based on network information and implement data communication through the connections, includes at least two super peers, and every super peer is configured to save network information of a communication peer which is logically closest to the super peer, forward messages among super peers and send the network information of a destination communication peer to an origination communication peer.

The method for data communication includes:

sending, by an origination communication peer, a query for a destination communication peer to a first super peer which is physically closest to the origination communication peer;

searching a second super peer which is logically closest to the destination communication peer from the first super peer;

sending, by the second super peer, saved network information of the destination communication peer to the origination communication peer;

establishing, by the origination communication peer, a connection to the destination communication peer based on the network information of the destination communication peer, transmitting data for data communication over the connection.

As seen from the above mentioned, network information of every communicating peer is saved in a super peer logically closest to the communication peer, so that the network information of the communication peers can be managed dispersedly. In such case, when a super peer saving the network information fails, only data communication of the communication peers closest to the super peer is impacted, data connection failure of large number of communicating peers will not occur, so the reliability of data communication will be improved. In addition, in the present invention, data does not need to be relayed by the relay server. So the problem of increasing cost increase and the problem of large-scale data communication paralysis brought by the relay server are solved.

DETAILED DESCRIPTION OF THE INVENTION

Description of the present invention is hereinafter given in detail with reference to the accompanying drawings and embodiments of the present invention.

The present invention discloses a method for data communication and system thereof. In the system disclosed by the present invention, some communication peers in communication system are assigned as super peers, and the super peers form a super peer layer. When a communication peer logs into the communication system, the communication peer logs into the first super peer which is physically closest to the communication peer, and the first super peer registers network information of the communication peer on the second super peer whose TD is closest to the communication peer's ID through transmission among the super peers. When an origination communication peer needs to transmit data to a destination communication peer, the origination communication peer sends a query to the super peer which is physically closest to the origination communication peer, the super peer searches locally, if no network information of the destination communication peer is found in the super peer, the query will be sent to another super peer whose ID is closest to the destination communication peer's ID. And the another super peer returns the network information of the destination communication peer to the origination communication peer, so the origination communication peer can establish a network connection with the destination communication peer according to the network information of the destination communication peer, and start data communication with the destination communication peer.

The present invention is described in detail with reference to the accompanying drawings and embodiments hereafter.

Figure 1:
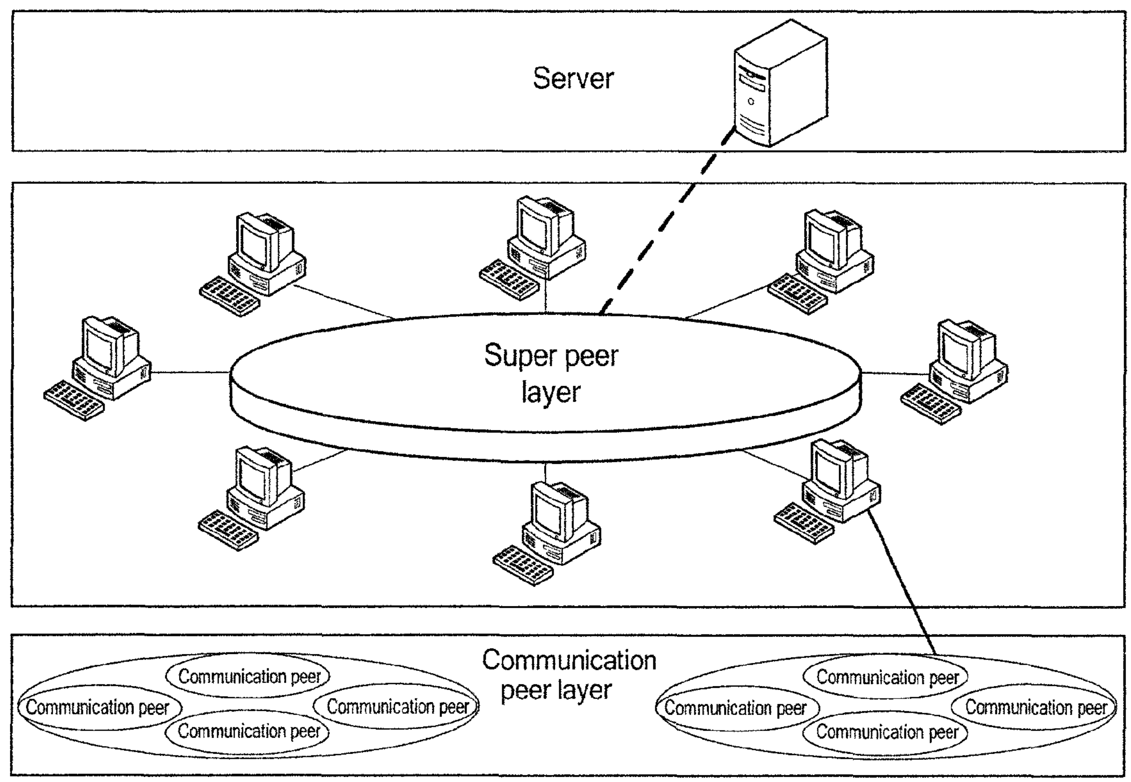
FIG. 1 shows a schematic diagram illustrating an exemplary structure of the system of the present invention.

As shown in FIG. 1, in the system in accordance with the present invention, there are a number of communication peers used for data communication. And there are some super peers forming a super peer layer in the communication system shown in FIG. 1.

When a communication peer logs in the communication system, through messages forwarding among the super peers in the super peer layer, network information of the communication peer is saved in a super peer which is logically closest to the communication peer.

And when an origination communication peer searches a destination communication peer, through the message forwarding among super peers in the super peer layer, a super peer which is logically closest to the destination communication peer returns the network information of the destination communication peer to the origination communication peer.

In the above mentioned system, every super peer has following properties:

1. In order to guarantee that communication peers for data transmission can log in super peers, the super peer should be public network type peer or a hybrid network address translation (Full Cone) type peer.

2. In order to improve efficiency of the communication network, bandwidth and online time length of the super peer need to be larger than or equal to a preset bandwidth and a preset online time length respectively. The preset online time length can vary according to the practical condition. In initial stage of network construction, the preset online time length can be relatively short; and when the network is normally working for a long period of time, the preset online time length should be relatively long.

Every super peer has a route table, and IDs and network information of other super peers connected with the super peer are saved in the route table. The network information includes network types, IP addresses and port numbers of internal networks and external networks. According to ID of logged communication peer or destination communication peer, a super peer can search for another super peer whose ID is closest to the ID of the communication peer in the area of the super peer by employing the route table. Then the super peer routes the communication to the mentioned another super peer. And said another super peer also performs the searching and routing process by using the route table in said another super peer, until the communication is routed to the super peer whose ID is closest to the communication peer above mentioned.

As shown in FIG. 1, the system provided by the present invention also can include a center server. And the center server includes one or more than one server used for collecting network information of every super peer and instructing every super peer to update route table respectively. The system provided by the present invention also can work without the servers, which does not affect the implementation of the present invention.

A detailed description is hereinafter given to the method provided by the present invention with reference to the accompanying drawings.

Figure 2:
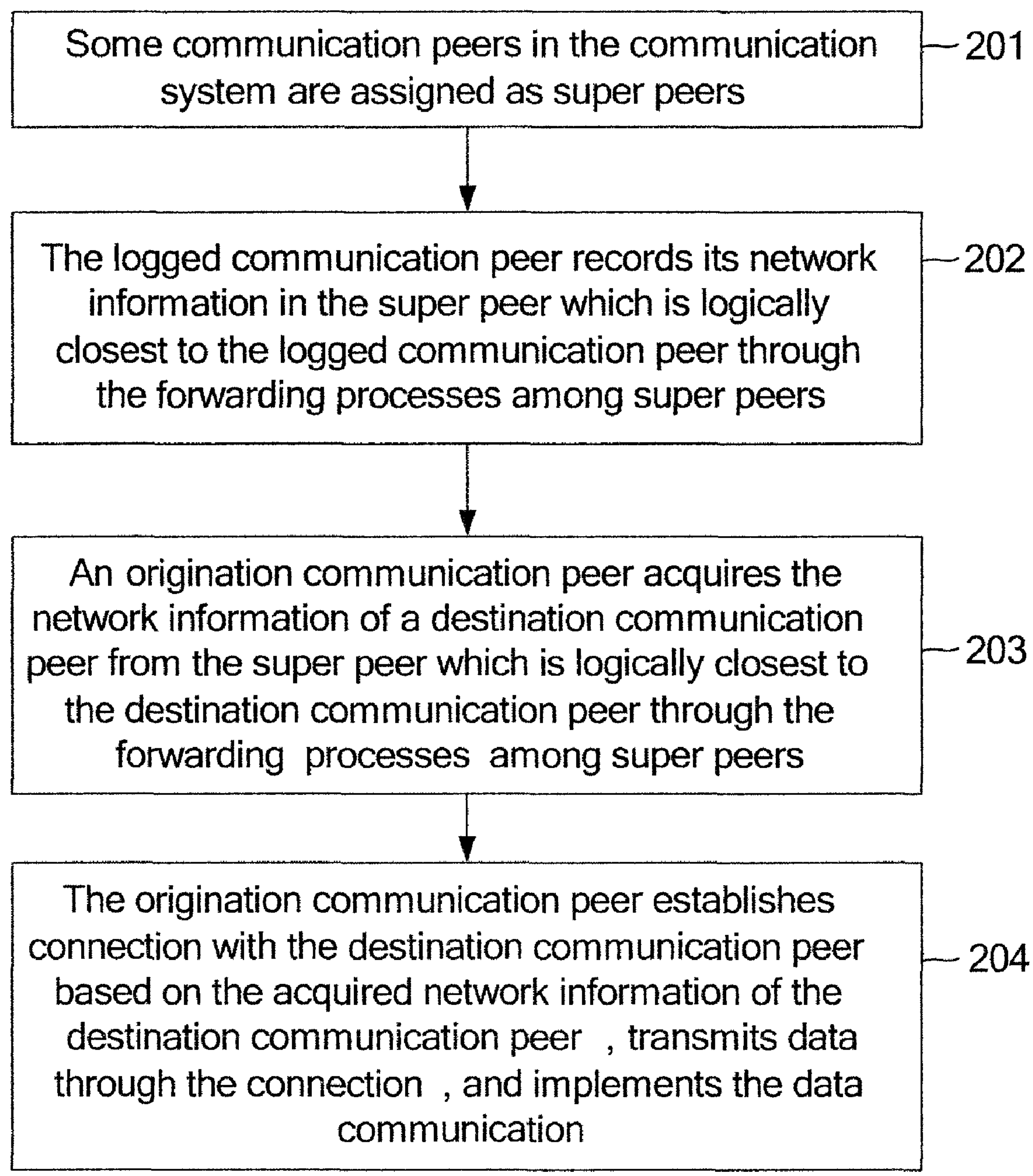
FIG. 2 shows a flow chart of an exemplary method of the present invention.

As shown in FIG. 2; the method in accordance with an embodiment of the present invention includes processes as follows.

According to processes in block 201, some communication peers in the communication system are assigned as super peers, and each super peer saves route information of the communication peers or the super peers connected with it.

According to processes in block 202, a communication peer logs in the super peer which is physically closest to the communication peer. From the super peer, the other super peers in the super peer layer in turn forward the network information of the communication peer to each other according to the route information stored, until the network information of the communication peer is forwarded to and recorded in the super peer which is logically closest to the communication peer.

According to processes in block 203, an origination communication peer sends a query for a destination communication peer to the first super peer which is physically closest to the origination communication peer. From the first super peer, other super peers in turn forward the query based on the route information stored, until the query is forwarded to the second super peer which is logically closest to the destination communication peer. The second super peer sends the stored network information of the destination communication peer to the origination communication peer.

According to processes in block 204, the origination communication peer establishes a connection with the destination communication peer according to the acquired network information of the destination communication peer, and transmits data through the connection, and implements the data communication.

The implementation of the above processes is hereinafter described in detail with reference to specific embodiments. In the embodiments of the present invention, the ID is regarded as route information of every communication peer or super peer. The super peer which is logically closest to the communication peer is the super peer whose ID is closest to the ID of the communication peer. In order to simplify the description of the embodiment of the present invention, the super peer which is physically closest to the communication peer is called a physical super peer (PSP) of the communication peer, and the super peer which is logically closest to the communication peer is called a logical super peer (LSP) of the communication peer.

Figure 3:
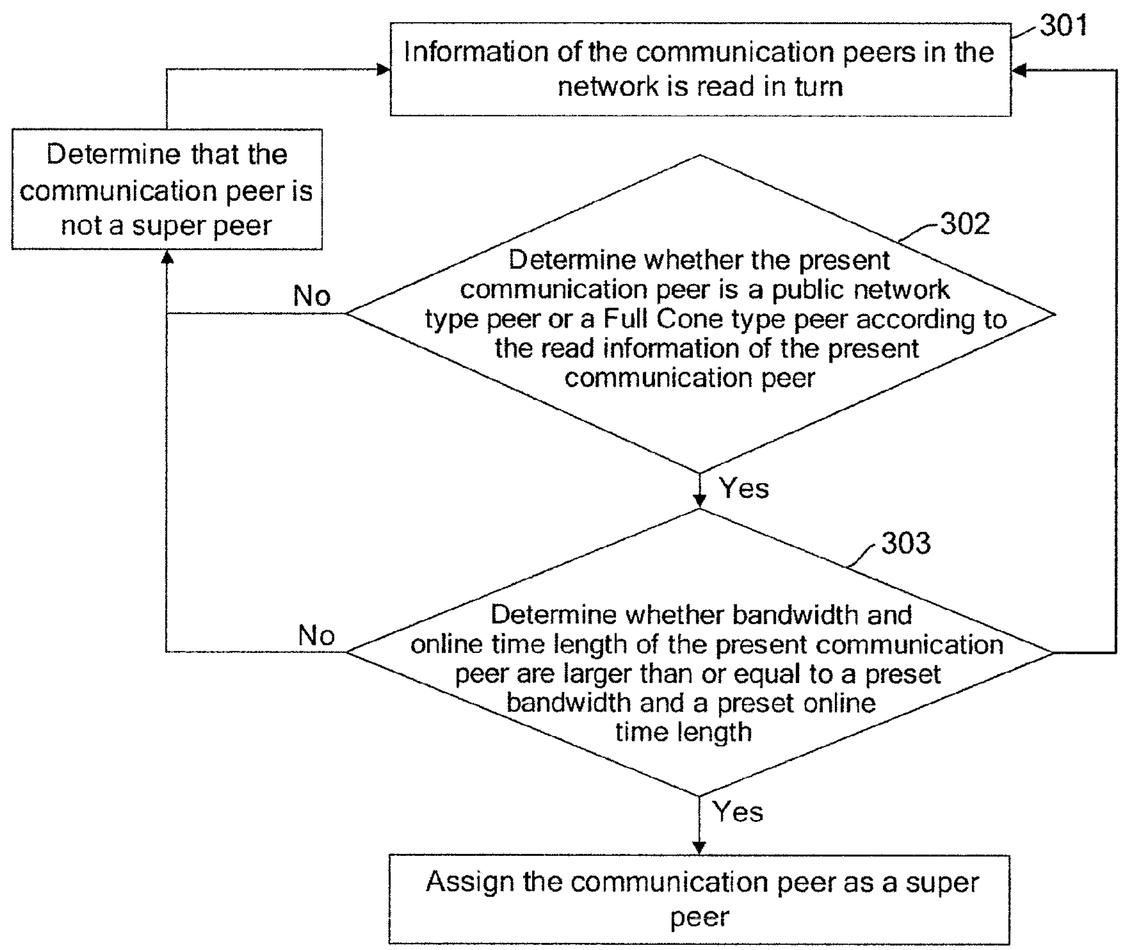
FIG. 3 shows an exemplary flow chart illustrating the detailed processes in block 201 of the present invention.

As shown in FIG. 3, in the embodiment of the present invention, the processes in the block 201 in detail include the processes as follows.

According to processes in block 301, information of the communication peers in the network is read in turn.

According to processes in block 302, it is to determine whether the current communication peer is a public network type peer or a Full Cone type peer according to the read information of the current communication peer; if yes, the processes in block 303 are performed; otherwise, it is to determine that the current communication peer is not a super peer, the processes in block 301 are performed to other communication peers.

According to processes in block 303, it is to determine whether bandwidth and online time length of the current communication peer are larger than or equal to a preset bandwidth and a preset online time length; if yes, the current communication peer is assigned as a super peer; otherwise, it is to determine that the current communication peer is not the super peer, and the processes in block 301 are performed to other communication peers. The preset online time length can vary according to a practical condition. In initial stage of network construction, the preset online time length can be relatively short; and when the network is normally working for a long period of time, the preset online time length should be relatively long.

Figure 4:
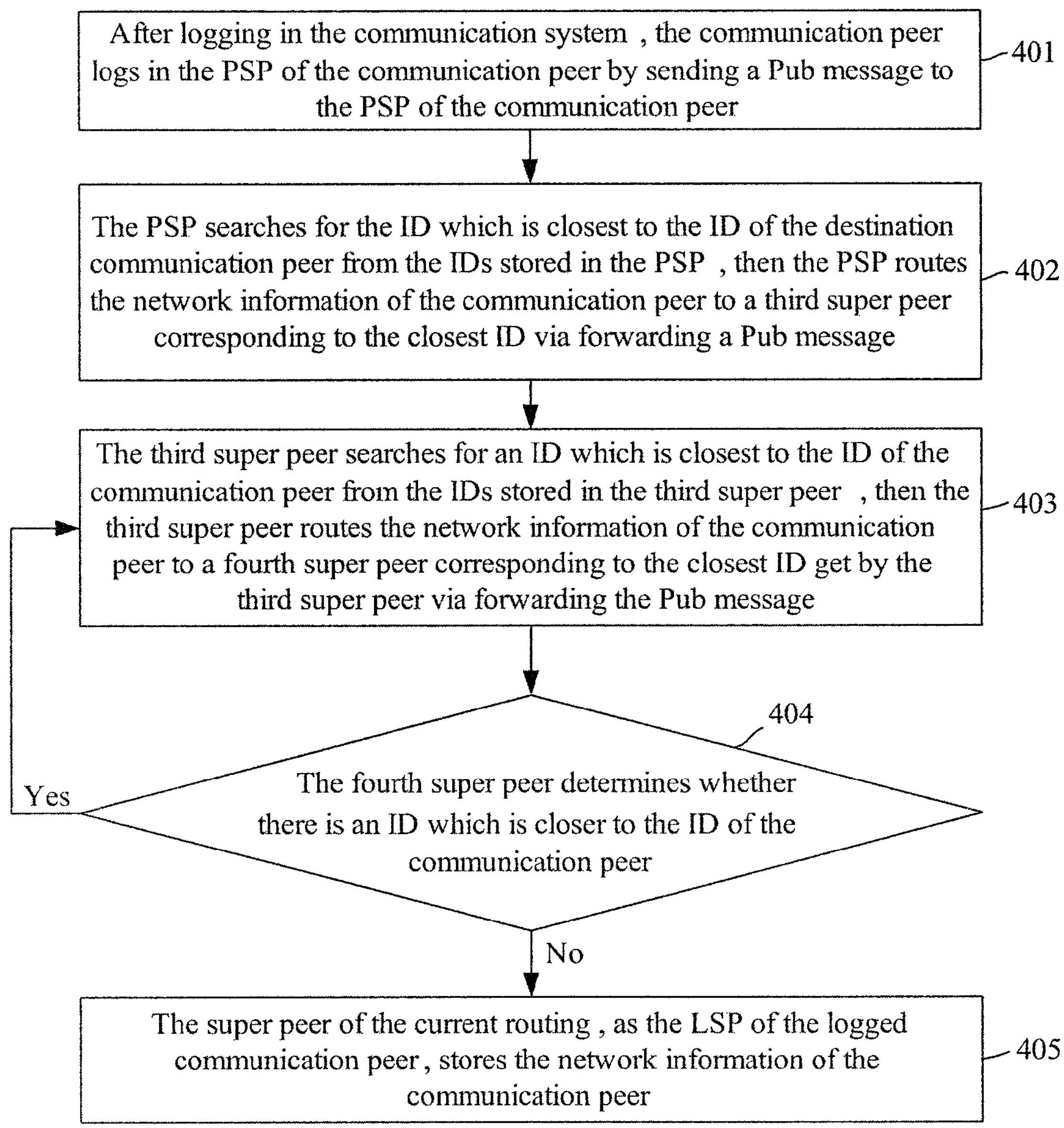
FIG. 4 shows an exemplary flow chart illustrating the detailed processes in block 202 of the present invention.

As shown in FIG. 4, in the embodiment of the present invention, the processes in the block 202 in detail include the processes as follows.

According to processes in block 401, after logging in the communication system, the communication peer logs in the PSP of the communication peer by sending a Pub message to the PSP of the communication peer, and sends the network information of the communication peer to the PSP.

According to processes in block 402, firstly the PSP searches locally, and determines whether the network information of the destination communication peer is stored locally according to the ID in the network information of the communication peer. If yes, the network information of the communication peer is returned to the origination communication peer directly, and the processes are terminated; otherwise, the PSP searches for the ID which is closest to the ID of the destination communication peer from the IDs stored in the PSP, then the PSP routes the network information of the communication peer to the third super peer corresponding to the closest ID via forwarding a Pub message.

According to processes in block 403, the third super peer searches for an ID which is closest to the ID of the communication peer from the IDs stored in the third super peer, then the third super peer routes the network information of the communication peer to the fourth super peer corresponding to the closest ID get by the third super peer via forwarding the Pub message.

According to processes in block 404, the fourth super peer determines whether there is an ID which is closer to the ID of the communication peer. If yes, the like processes in block 403 are performed until the ID which is closest to the ID number of the communication peer is searched from IDs of all communication peers, and then the processes in block 405 are performed; otherwise, the processes in block 405 are directly performed.

According to processes in block 405, the super peer of the present routing, as the LSP of the logged communication peer, stores the network information of the communication peer.

Figure 5:
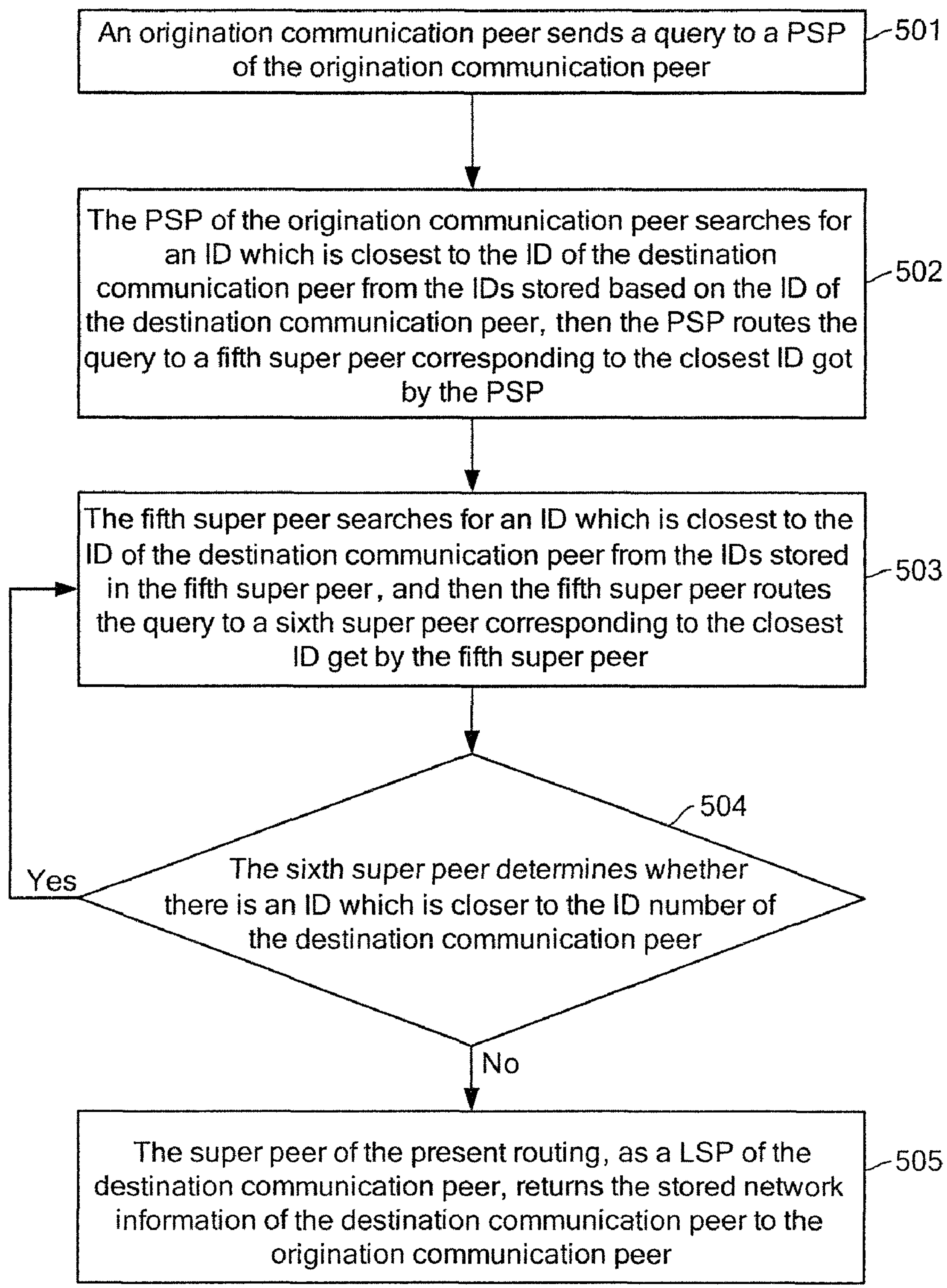
FIG. 5 shows an exemplary flow chart illustrating the detailed processes in block 203 of the present invention.

As shown in FIG. 5, in the embodiment of the present invention, the processes in the block 203 in detail include the processes as follows.

According to processes in block 501, an origination communication peer sends a query to a PSP of the origination communication peer, and the query includes an ID of the destination communication peer.

According to processes in block 502, the PSP of the origination communication peer searches for an ID which is closest to the ID of the destination communication peer from the IDs stored based on the ID of the destination communication peer. Then the PSP routes the query to the fifth super peer corresponding to the closest ID got by the PSP.

According to processes in block 503, the fifth super peer searches for an ID which is closest to the ID of the destination communication peer from the IDs stored in the fifth super peer, and then the fifth super peer routes the query to the sixth super peer corresponding to the closest ID get by the fifth super peer.

According to processes in block 504, the sixth super peer determines whether there is an ID which is closer to the ID number of the destination communication peer. If yes, the like processes in block 503 are performed until the ID which is closest to the ID number of the communication peer is searched from IDs of all communication peers, and then the processes in block 505 are performed; otherwise, the processes in block 505 are directly performed.

According to processes in block 505, the super peer of the present routing, as a LSP of the destination communication peer, returns the stored network information of the destination communication peer to the origination communication peer.

The processes in the block 204 are described in detail hereinafter.

In embodiment of the present invention, a connection between an origination communication peer and a destination communication peer can be established via the following three methods.

The first method is that the connection is established via by internal network direct-connections.

The origination communication peer sends a connection request to an internal IP address and port number of the destination communication peer directly according to the acquired internal IP address and port number in the network information of the destination communication peer. And the connection request can be sent through Transfer Control Protocol (TCP) or User Datagram Protocol (UDP). In practical applications, the two protocols can be chosen according to practical demands. For data communication of voice and audio, the UDP is used preferentially; for some application with relatively high requirement of transmission reliability, the TCP is used preferentially. In practice, if the TCP is used preferentially to send the connection request, the UDP can be further used to try to establish the connection while the connection can not be established by using the TCP. Similarly, if the UDP is used preferentially to send the connection request, the TCP can be further used to try to establish the connection while the connection can not be established by using the UDP.

The second method is that the connection is established via external network direct-connections.

In the second method, before a communication peer logs in the communication system, an STUN test for network address translation is needed. After the STUN test, the external IP address and port number of the communication peer can be obtained. And the communication peer adds the acquired external IP address and port number to the network information of the communication peer. In such case, the network in formation of the destination communication peer acquired by the origination communication peer includes the external IP address and port number of the destination communication peer. Then the origination communication peer sends a connection request to the external IP address and port number of the destination communication peer directly, and establishes the connection between the origination communication peer and the destination communication peer. The detailed implementation is same as the processes of internal network direct-connection, and will not be described in detail herein.

The third method is that the connection is established by a traversal of UDP.

In the third method, before a communication peer logs in the system, an STUN test is performed to acquire an external IP address, a port number and a network type of the communication peer. In this case, network information of the destination communication peer acquired by the origination communication peer includes the external IP address, port number and network type of the destination communication peer. And the origination communication peer determines a connection mode according to network types of the origination communication peer and the destination communication peer.

If one party of the communication is public network peer and the other part is Full Cone peer, the Full Cone party can require the other party to initiate the connection. If the parties of the communication are neither the public network peer nor the Full Cone peer, the origination communication peer can send a traversal request to the PSP of the destination communication peer, the PSP of the destination communication peer forwards the received traversal request to the origination communication peer and the destination communication peer respectively. Upon receiving the traversal request from the PSP of the destination communication peer, the origination communication peer and the destination communication peer respectively send UDP traversal packets to the external IP address and port number of each other, so as to establish the connection between the origination communication peer and the destination communication peer.

in practical application, the above three methods can be performed at the same time. If the connection is established successfully by any one of the above mentioned three methods, the other two methods will not be used again. If all three methods fail, the origination communication peer sends a request for searching a relay seed to the super peers connected with the origination communication peer. The super peer acquires information of the communication peer which can forward data via a center server or other super peers, and returns the information acquired to the origination communication peer. The origination communication peer establishes a relay channel based on the information from the super peer, and establishes the connection with the destination communication peer. If there are multiple communication peers which can relay data, the origination communication peer can establish a number of relay channels based on the information of the multiple communication peers, and one of the relay channels is regarded as a main channel, others are regarded as backup channels. If the main channel of data communication is disconnected, data communication is switched to the backup channel. In this way, the probability of unsuccessful communication between the two parties brought by the quitting of a third party is greatly reduced.

In practical application, when each communication peer in the system quit or log in the system, the route table in each super peer needs to be updated. In embodiments of the present invention, there are two manners to update the route table.

The first manner is described as follows. In a situation with a center server, each super peer holds the connection with the center server which saves the information of all super peers. And the super peer periodically sends a request for updating the route table to the center server, and the center server returns the newest route table to the super peer.

The second manner is described as follows. In a situation without a center server, all of super peers exchange route information with each other to update each route table.

According to system and method provided by the present invention, multiparty communication can be implemented and the specifically application of the multiparty communication mainly includes the following two patterns.

A conference pattern: after voice processes to every attendee, a chairman relays voice of every attendee to other attendees so as to implement voice communication between multiple users. When another attendee want to participate the conference, the attendee searches the chairman firstly, and then establishes a connection with the chairman according to the above mentioned method, then sends its own data to the chairman. Upon processing to the data of the attendee, the chairman forwards the data of the attendee to others attendee in the conference. And the chairman can mix voices of different attendees, and send the mixed data to other attendees.

A peer to peer pattern: a data channel between every two peers is established, such as multi-user video. A user directly establishes connection with each user which has the requirement of data communication by using the above mentioned method of the present invention, and sends the application data through the connection. For example, in a video conference with multiple users, user A expects to see the video of user B and user C, so user A establishes a data channel with user B and user C respectively so as to implement multi-user video communication.

The foregoing is only preferred embodiments of the present invention and is not for use in limiting the present invention. Any modification, equivalent replacement or improvement made under the spirit and principles of the present invention is included in the protection scope thereof.

What is claimed is:

1. A system for data communication, comprising communication peers which establish connections based on network information and implement data communication through the connections, wherein the system comprises at least two super peers, and every super peer is configured to save route information of connected communication peers or super peers, forward network information of a logged communication peer which is logically closest to the super peer according to saved rout information, forward messages among the super peers and send the network information of a destination communication peer to an origination communication peer, wherein the origination communication peer is configured to send a query for the destination communication peer to a first super peer which is physically closest to the origination communication peer, establish a connection to the destination communication peer based on the network information of the destination communication peer, and transmit data for data communication over the connection, wherein the super peer which is physically closest to the communication peer is called a physical super peer of the communication peer; and the super peer which is logically closest to the communication peer is called a logical super peer of the communication peer, and the physical super peer is configured to search an ID which is closest to the ID in the network information of the logged communication peer from the saved IDs, forward the network information of the logged communication peer to the super peer corresponding to the closest ID, and the logical super peer of the communication peer is configured to receive and save the network information.

2. The system according to claim 1, wherein the super peers comprise a part of the communication peers.

3. The system according to claim 2, wherein the super peer comprises a public network communication peer or hybrid network address translation communication peer.

4. The system of claim 1, wherein the super peer comprises a communication peer whose bandwidth is larger than or equal to a preset bandwidth, and whose online time length is larger than or equal to a preset online time length.

5. The system of claim 1, wherein the system further comprises:

a center server, collecting network information of every super peer, and instructing every super peer to update a route table of the every super peer.

6. A method for data communication, comprising:

assigning a part of communication peers as super peers, wherein every super peer saves route information of the connected communication peers or super peers;

logging in, by a communication peer, the super peer which is physically closest to the communication peer;

forwarding in turn, by every super peer, from the super peer which is physically closest to the communication peer, network information of the logged communication peer according to saved route information, until the network information of the logged communication peer is forwarded to and recorded in the super peer which is logically closest to the logged communication peer;

sending, by an origination communication peer, a query for a destination communication peer to a first super peer which is physically closest to the origination communication peer;

searching a second super peer which is logically closest to the destination communication peer from the first super peer;

sending, by the second super peer, saved network information of the destination communication peer to the origination communication peer; and establishing, by the origination communication peer, a connection to the destination communication peer based on the network information of the destination communication peer, transmitting data for data communication over the connection; and wherein the super peer which is physically closest to the communication peer is called a physical super peer of the communication peer; and the super peer which is logically closest to the communication peer is called a logical super peer of the communication peer, and the processes of logging in, by a communication peer, the super peer which is physically closest to the communication peer, and forwarding in turn, by every super peer from the super peer which is physically closest to the communication peer, network information of the logged communication peer according to the saved route information, until the network information of the logged communication peer is forwarded to and recorded in the super peer which is logically closest to the logged communication peer comprises, logging in, by the communication peer, the physical super peer of the communication peer after logging in a communication system, and sending the network information of the communication peer to the physical super peer of the communication peer, searching, by the physical super peer, an ID which is closest to the ID in the network information of the logged communication peer from the saved IDs, forwarding the network information of the logged communication peer to the super peer corresponding to the closest ID, and repeating the forwarding process, by the super peer to which the network information is forwarded, until the network information is forwarded to and saved in the logical super peer of the communication peer.

7. The method according to claim 6, wherein the assigning a part of communication peers as super peers comprises:

reading information of the communication peer in network in turn;

if it is determined that the current communication peer is a public network peer or a hybrid network address translation peer according to the read information of the current communication peer, and bandwidth and online time length of the current communication peer are larger than or equal to a preset bandwidth and online time length, assigning the current communication peer as a super peer; otherwise determining the current communication peer is not a super peer, and returning to the process of reading information of the communication peer in network to perform the determining processes to other communication peers.

8. The method according to claim 6, wherein the super peer which is physically closest to the communication peer is called a physical super peer of the communication peer; and the super peer which is logically closest to the communication peer is called a logical super peer of the communication peer; and the process of sending, by an origination communication peer, a query for a destination communication peer to a first super peer which is physically closest to the origination communication peer; searching a second super peer which is logically closest to the destination communication peer from the first super peer; sending, by the second super peer, saved network information of the destination communication peer to the origination communication peer comprises:

sending, by the origination communication peer, the query to the physical super peer of the origination communication peer, wherein the query includes the ID of the destination communication peer;

searching, by the physical super peer, an ID which is closest to the ID of the destination communication peer from the saved IDs; forwarding the query to the super peer corresponding to the closest ID; repeating the forwarding process by the super peer to which the query is forwarded, until the query is forwarded to and saved in the logical super peer of the destination communication peer;

sending, by the logical super peer of the destination communication peer, the saved network information of the destination communication peer to the origination communication peer.

9. The method according to claim 6, wherein the establishing, by the origination communication peer, connection to the destination communication peer comprises:

sending, by the origination communication peer, a connection request directly to an internal network IP address and a port number of the destination communication peer based on the acquired internal network IP address and port number of the destination communication peer; and establishing the connection between the origination communication peer and the destination communication peer.

10. The method according to claim 6, further comprising:

performing a Simple Traversal of User Datagram Protocol through Network Address Translators, STUN, test to a communication peer, acquiring an external IP address and a port number of the communication peer, and adding the external IP address and port number of the communication peer into the network information of the communication peer; and wherein the establishing by the origination communication peer a connection to the destination communication peer comprises:

sending directly, by the origination communication peer, a connection request to the external IP address and port number of the destination communication peer based on the acquired external IP address and port number of the destination communication peer; and establishing, by the origination communication peer, the connection with the destination communication peer.

11. The method according to claim 6, further comprising:

performing an STUN test to a communication peer, acquiring an external IP address, a port number and a network type of the communication peer, and adding the external IP address, port number and network type into the network information of the communication peer; and wherein the establishing by the origination communication peer a connection to the destination communication peer comprises:

determining, by the origination communication peer, a connection mode according to the network type of the origination communication peer and the network type of the destination communication peer:

if one party of communication is a public network peer and the other part of communication is a network address translation peer, initiating, by the public network peer, the connection;

if the two parties of communication are neither public network peers nor the network address translation peers, sending, by the origination communication peer, a traversal request to the physical super peer of the destination communication peer; forwarding, by the physical super peer, the traversal request to the origination communication peer and the destination communication peer respectively; sending, by the origination communication peer and the destination communication peer respectively, User Datagram Protocol, UDP, traversal packets to the external IP address and port number of each other, so as to establish the connection between the origination communication peer and the destination communication peer.

12. The method according to claim 6, wherein the establishing by the origination communication peer a connection to the destination communication peer comprises:

establishing the connection via an internal network direct-connection, an external network direct-connection and a traversal of UDP at the same time;

and when the connection is established by any one of the three connection methods, stopping establishing the connection in the other two methods.

13. The method according to claim 12, further comprising:

if failing to establish the connection via any one of the three connection methods, sending, by the origination communication peer, a request for searching a relay seed to super peers connected with the origination communication peer;

acquiring, by the super peers, information of the communication peer which can forward data via a center server or other super peers, and returning the information acquired to the origination communication peer;

establishing, by the origination communication peer, a relay channel based on the information from the super peer to establish the connection to the destination communication peer.

14. The method according to claim 13, wherein the establishing relay channel by the origination communication peer comprises:

establishing a number of relay channels in which one of the relay channels is regarded as a main channel, others are regarded as backup channels;

and the method further comprises:

switching data communication to the backup channel if the main channel of data communication is disconnected.

15. The method according to claim 6, wherein the super peer performs forwarding according to router information saved, and the method further comprises:

updating the route information of every super peer.

16. The method according to claim 15, wherein the updating the route information comprises:

sending periodically, by the super peer, a request for updating a route table to the center server;

returning, by the center server, the newest route table to the super peer.

17. The method according to claim 15, wherein the updating the route information comprises:

exchanging, by all of the super peers, the route information with each other to update the route table in each super peer.

* * * * *